May 15, 1945.  L. WALLERSTEIN, JR  2,376,317
VIBRATION ISOLATOR
Filed July 11, 1944
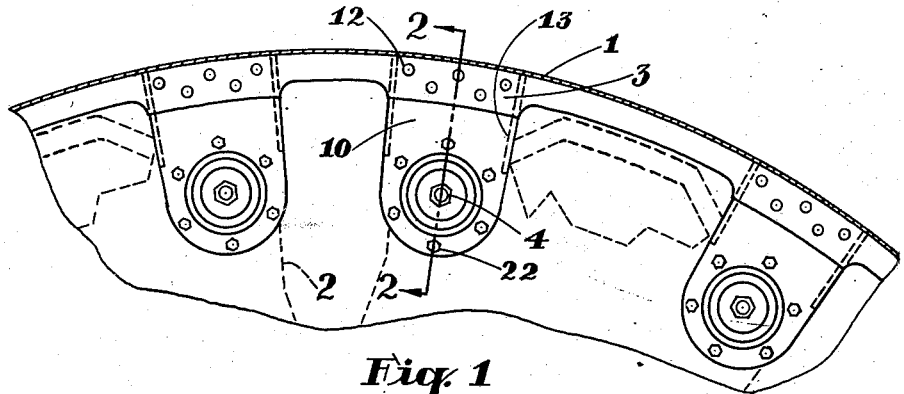
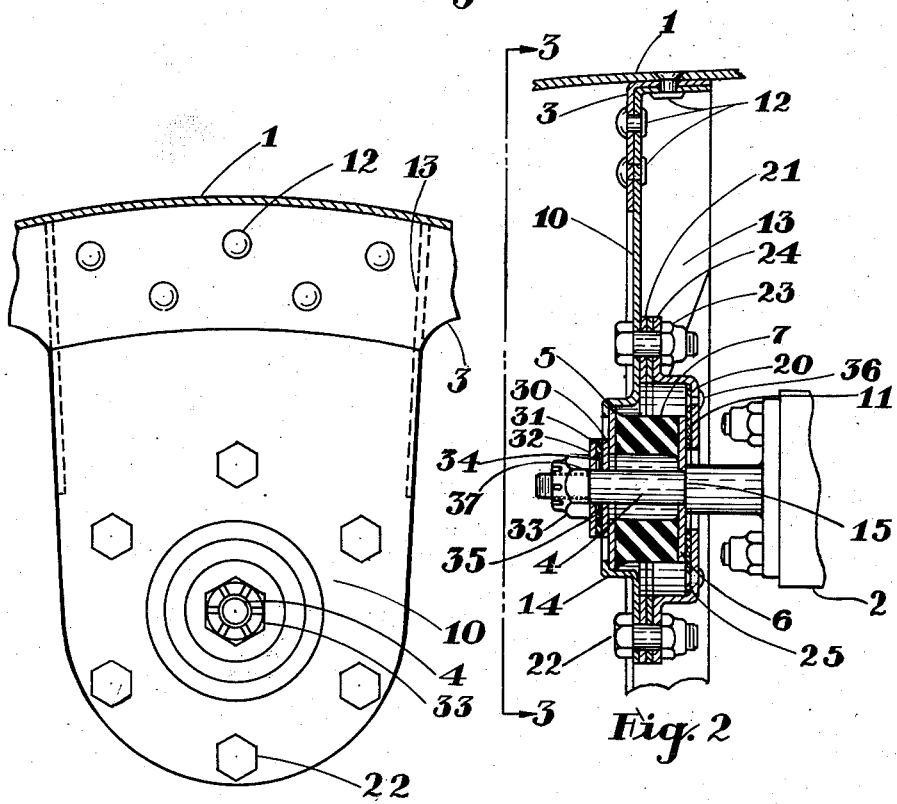
Inventor
LEON WALLERSTEIN, JR.
By H. C. Ford
Attorney Patented May 15, 1945

2,376,317

UNITED STATES PATENT OFFICE 2,376,317

VIBRATION ISOLATOR

Leon Wallerstein, Jr., Erie, Pa., assignor to Lord Manufacturing Company, Erie, Pa., a corporation of Pennsylvania Application July 11, 1944, Serial No. 544,445

9 Claims. (Cl. 248—358)

This invention relates generally to mountings which include resilient bodies, usually made of rubber, for insulating vibrations, and particularly to mountings of this character that are used for attaching to airplane engines the cowls that surround them.

When an airplane is in flight the cowl surrounding its engine is subjected to heavy air pressure loads which act substantially parallel to the torque axis of the engine, and the engine may vibrate rotationally and/or translationally with respect to each of its three principal axes. Furthermore, when heated the engine thermally expands, the diametrical radial expansion of a large radial engine being more than one-fourth of an inch. These several forces, which differ in character, magnitude and direction, all act upon the mountings that are used to attach a cowl to an airplane engine.

A general object of this invention is to provide a simple, effective and inexpensive mounting for attaching a supported member to a supporting member which have relative movements of the character described, the mounting being provided with a resilient body, such as rubber, for isolating normal vibrations and relative movements and with adjustable sliding friction resistance for damping some of the vibrations and movements, and a particular object is to provide a mounting of this character for attaching a cowl to an airplane engine.

The mounting here provided includes a sandwich formed of a pair of plates having a body of resilient material, such as rubber, bonded to their opposed faces. The sandwich is placed in a casing which is formed for attachment to one of two relatively movable members, the casing having such fixed engagement with one of the sandwich plates that such plate moves with the casing, and the casing having such sliding friction engagement with the other of the sandwich plates as to dampen some of the vibrations. The last-mentioned sandwich plate is formed to have such fixed engagement with the other of the two relatively movable members that the plate moves with such member. Provision is preferably made for adjusting the pressure of the casing upon the sandwich plate with which the casing has sliding friction engagement, the purpose being to vary the frictional resistance to sliding. The mounting is so constructed that some of the vibratory and other relative movements of the members to which it is attached are isolated by shear and others by compressive action or a combination of shear and compression stresses in the rubber, and that vibrations which are isolated wholly or partly by shear action in the rubber are dampened by sliding friction.

In the accompanying drawing the preferred embodiment of the invention is illustrated in its applicability to mountings for attaching a cowl to an airplane engine. In the drawing, Fig. 1 is an end elevation or face view of an outer portion of a radial airplane engine, the figure showing a cowl in vertical section and face views of mountings connecting it to the engine; Fig. 2 a central sectional view to enlarged scale of one of the mountings, the view being taken on the line 2—2, Fig. 1; and Fig. 3 a face view of the mounting to a like enlarged scale looking in the direction indicated by the line 3—3, Fig. 2.

The drawing shows a cowl 1 attached to the heads of several cylinders of a radial airplane engine 2 by mountings constructed according to this invention. The number of such mountings used on one or both sides of the engine may vary according to service requirements. Each is connected to a former ring 3 in the form of an angle-shaped member attached to the interior of the cowl, and to a pin 4 which is attached to a cylinder head and extends parallel to the torque axis of the engine. The mounting includes a sandwich formed by a pair of plate-like rings 5 and 6 and a ring-shaped body of rubber bonded to the opposed faces of these plates, the inner annular face of the rubber ring being spaced materially from pin 4 as shown.

The sandwich is mounted under compression in a two-part casing consisting of a main plate 10 and a cover plate 20. The main plate is shown as being attached to former ring 3 by rivets 12, and as having its edges provided with strengthening flanges 13, and as being recessed in cup form at 14 to receive sandwich plate 5 which is so engaged by the recess as to cause casing plate 10 and sandwich plate 5 to move as a unit. Pin 4 is provided with a shoulder 15 for engaging the outside face of sandwich plate 6, whose bore engages the smaller diameter of the pin adjacent to the shoulder, the construction being such that plate 6 is so fixedly attached to pin 4 that the two move as a unit.

Cover plate 20 has an inwardly turned flange 11 which bears upon the outer face of sandwich plate 6 and is slidable thereon, the inner annular edge of this flange being spaced materially from pin 4. The cover plate is also provided with an outwardly extending flange 24 for attaching it to plate 10 by bolts 22 and nuts 23, spacer rings 21 being placed between plate 10 and flange 24 to adjust the pressure of flange 11 upon sandwich plate 6. The inner face of flange 11 of the cover plate may be provided with a ring-shaped body 25 of friction material such as brake lining.

Bearing upon the inner portion of outer sandwich plate 5 there is a washer formed of two rigid metal rings 30 and 32 between whose opposed faces there is a ring-shaped body 31 of resilient material such as rubber, which is under compression of less force than that in the body of rubber 7 in the sandwich. The outer face of this washer is engaged by a nut 33 threaded on the end of pin 4 for holding the mounting on the pin, and the inner face engages plate 5 with sliding friction contact. The threaded portion of pin 4 is smaller in diameter than the adjacent unthreaded portion, and nut 33 seats on a shoulder 37 between the two portions. A washer 35 of less thickness than resilient ring 31 is placed within such ring to position it concentrically with pin 4.

In the use of cowl mountings positioned as herein disclosed, the greatest loads of the cowl placed upon the engine are thrust loads parallel to the torque axis of the engine, and such loads are transmitted to the engine by compression of rubber ring 7. When cowl force is directed towards the cylinder head the load acts through main casing plate 10, sandwich plate 5, rubber ring 7, sandwich plate 6 and the shoulder 15 on pin 4 which is attached to the engine. When the cowl force is away from the cylinder head the load is transmitted through main casing plate 10, cover plate 20, friction material 25, sandwich plate 6, rubber ring 7, sandwich plate 5, washer 30, resilient ring 31, washer 32 and nut 33 attached to pin 4. All such force in excess of that required to compress ring 31, an amount equal to the axial clearance, indicated at 34, between washer 35 and ring 32, is transferred from ring 30 to ring 32 by metal washer 35, thus by-passing resilient ring 31. Vibrations of the engine parallel to its torque axis are similarly accommodated by compression on the rubber, while the vibrations of the engine perpendicular to and around its torque axis are accommodated by shear stresses transmitted through sandwich plate 6 to rubber ring 7. Vibrations perpendicular to and around the torque axis of the engine are also dampened by the frictional engagement of flange 11 of cover plate 20 upon sandwich plate 6 which may be varied by adding or removing spacer rings 21, and compensation for radial thermal expansion of the engine is also made by this variable sliding friction engagement of sandwich plate 6 upon cover plate 20. Such vibrations and motions are also dampened and accommodated respectively by sliding frictional engagement between washer 30 and plate 5. Thus, resistance to forces in shear upon rubber ring 7 is augmented by friction.

What I claim as new is:

1. A vibration isolator for mounting two relatively movable members, comprising a sandwich formed of a pair of plates having a body of resilient material such as rubber bonded to their opposed faces, a casing formed for attachment to one of said members and fixedly engaging one of said plates and having sliding friction engagement with the other, the latter of said plates being formed to have fixed engagement with the other of said movable members.

2. A vibration isolator for mounting two relatively movable members, comprising a sandwich formed of a pair of plates having a body of resilient material such as rubber bonded to their opposed faces, a casing formed for attachment to one of said members and fixedly engaging one of said plates and having sliding friction engagement with the other, the latter of said plates being formed to have fixed engagement with the other of said movable members, and means for adjusting the pressure between said latter plate and the casing to vary the frictional resistance to sliding movements therebetween.

3. A vibration isolator for mounting two relatively movable members, comprising a sandwich formed of a pair of plates having a body of resilient material such as rubber bonded to their opposed faces, a casing formed of two plate-like parts arranged one on each side of said sandwich, one of said casing parts being formed for attachment to one of said movable members and fixedly engaging one of said sandwich plates, and the other of said casing parts having sliding friction engagement with the other of said sandwich plates, the last-mentioned sandwich plate being formed to have fixed engagement with the other of said movable members.

4. A vibration isolator for mounting two relatively movable members, comprising a sandwich formed of a pair of ring-shaped plates having a ring-shaped body of resilient material such as rubber bonded to their opposed faces, a casing formed of two plate-like parts arranged one on each side of said sandwich, one of said casing parts being formed for attachment to one of said movable members and being provided with a cup-shaped recess fixedly engaging one of said sandwich plates, and the other of said casing parts having sliding friction engagement with the other of said sandwich plates, the last-mentioned sandwich plate being formed to have fixed engagement with the other of said movable members.

5. A vibration isolator for mounting two relatively movable members, comprising a sandwich formed of a pair of ring-shaped plates having a ring-shaped body of resilient material such as rubber bonded to their opposed faces, a casing formed of two plate-like parts positioned one on each side of said sandwich and pressing it between them, one of said casing parts being formed for attachment to one of said movable members and being provided with a cup-shaped recess fixedly engaging one of said sandwich plates, and the other of said casing parts having sliding friction engagement with the other of said sandwich plates, the last-mentioned sandwich plate being formed to have fixed engagement with the other of said movable members, and means for adjusting the pressure of said casing parts upon said sandwich to vary the resistance to said sliding friction.

6. In an airplane, the combination with an engine provided with mounting supports, and a cowl enclosing the engine, of vibration isolators attaching the cowl to and supporting it by the engine; each isolator comprising a sandwich formed of a pair of plates having a body of resilient material such as rubber bonded to their opposed faces, a casing attached to said cowl and engine and fixedly engaging one of said sandwich plates and having sliding frictional engagement with the other, the latter of said sandwich plates having fixed engagement with said engine.

7. In an airplane, the combination with an engine provided with pins for the attachment of vibration isolators and a cowl enclosing the engine, of vibration isolators attaching the cowl to and supporting it by the engine, each isolator comprising a disk-shaped sandwich formed of a pair of metal rings having an annular body of resilient material such as rubber bonded to their opposed faces, a casing attached to said cowl and one of said engine pins and fixedly engaging one of said sandwich plates and having sliding frictional engagement with the other, the latter of said sandwich plates being mounted on and having fixed engagement with said engine pin.

8. In an airplane, the combination with an engine provided with pins for the attachment of vibration isolators, and a cowl enclosing the engine, of vibration isolators attaching the cowl to and supporting it by the engine, each isolator comprising a disk-shaped sandwich formed of a pair of metal rings having an annular body formed of resilient material such as rubber bonded to their opposed faces and a two-part casing enclosing said sandwich, one of the casing parts being attached to said cowl and fixedly engaging one of said sandwich plates, and the other of said sandwich plates having fixed engagement with one of said engine pins and having sliding friction engagement with the other of said casing parts.

9. In an airplane, the combination with an engine provided with pins extending parallel to its torque axis for the attachment of mountings, and a cowl enclosing the engine, of vibration isolators attaching the cowl to and supporting it by the engine, each isolator comprising a disk-shaped sandwich formed of a pair of metal rings having an annular body formed of resilient material such as rubber bonded to their opposed faces, said sandwich being mounted on and extending perpendicular to one of said engine pins, and a casing having two parts clamped together, and bearing upon the outer faces of said sandwich plates, one of the casing parts being attached to said cowl and fixedly engaging one of said sandwich plates, and the other of said sandwich plates having fixed engagement with said engine pin and having sliding friction engagement with the other of said casing parts.

LEON WALLERSTEIN, Jr.